United States Patent [19]

Kuhlmann et al.

[11] Patent Number: 4,517,869
[45] Date of Patent: May 21, 1985

[54] SAW TABLE FOR A COMPASS SAW

[75] Inventors: Gerhard Kuhlmann, Stuttgart; Erwin Wolf, Wei-sach, both of Fed. Rep. of Germany

[73] Assignee: Robert Bosch GmbH, Stuttgart, Fed. Rep. of Germany

[21] Appl. No.: 298,751

[22] Filed: Sep. 2, 1981

[30] Foreign Application Priority Data

Oct. 18, 1980 [DE] Fed. Rep. of Germany ....... 3039459

[51] Int. Cl.³ .................... B27B 19/04; B27B 19/06
[52] U.S. Cl. .................... 83/100; 83/477.2; 83/478; 83/574; 30/376; 144/252 R
[58] Field of Search ............ 83/574, 100, 477.2, 83/478; 30/376, 392; 144/252 R

[56] References Cited

U.S. PATENT DOCUMENTS

| 1,707,097 | 3/1929 | Ruschke | 30/376 X |
| 2,652,863 | 9/1953 | Grabinski | 83/574 |
| 3,905,273 | 9/1975 | Shook | 144/252 R X |
| 4,204,446 | 5/1980 | Knochel | 83/574 X |
| 4,367,665 | 1/1983 | Terpstra et al. | 83/100 |

Primary Examiner—Donald R. Schran
Attorney, Agent, or Firm—Michael J. Striker

[57] ABSTRACT

A saw table for a compass saw formed particularly as a hand-held power tool, has a table plate extending so that a compass saw is located under the table plate and a saw blade extends upwardly beyond the table plate and a protecting element associated with the table plate and arranged so that from a space above the table plate the protecting element overlaps the saw blade.

11 Claims, 4 Drawing Figures

U.S. Patent
May 21, 1985
4,517,869
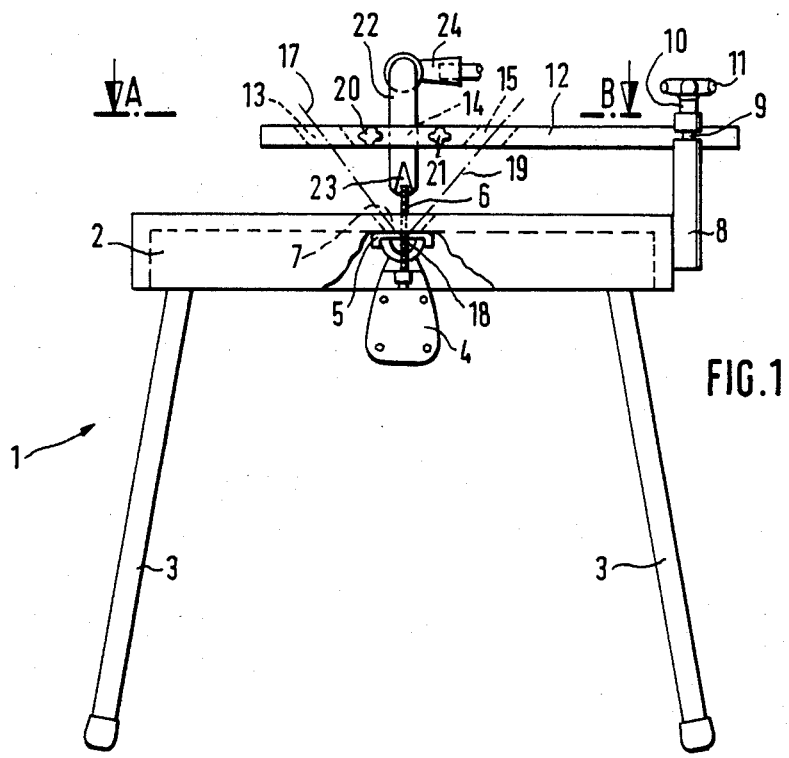
FIG.1
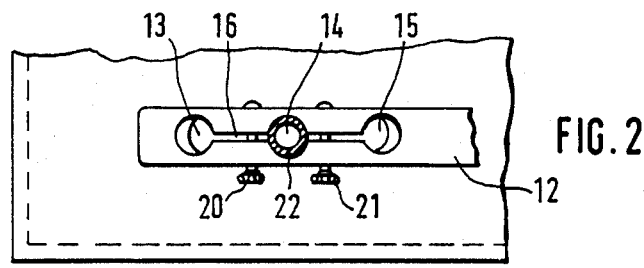
FIG.2
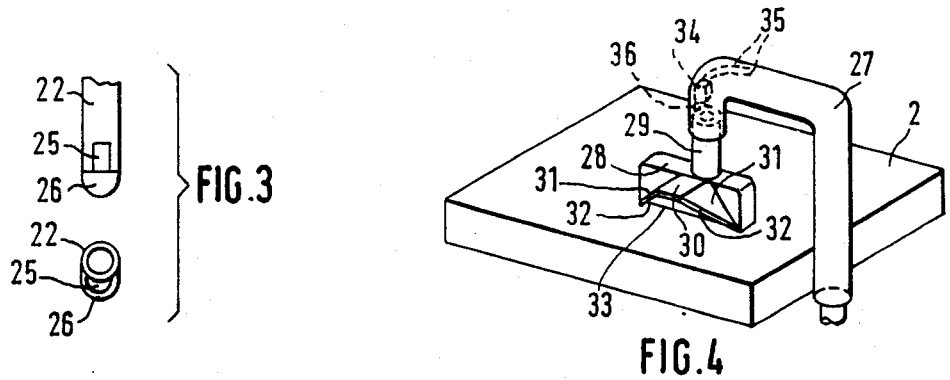
FIG.3
FIG.4

SAW TABLE FOR A COMPASS SAW

BACKGROUND OF THE INVENTION

The present invention relates to a saw table for a compass saw.

Saw tables for compass saws, particularly formed as hand-held power tools include a table plate arranged so that a compass saw is located under the table plate and a saw blade extends upwardly beyond the table plate. Known saw tables are provided with protective devices. More particularly, protective devices engage with the table plates and intended to protect circular saw blades of the compass saws. It has been recognized that these protective devices are not satisfactory. They require a complicated movable support for the protective device or they make impossible to produce curved cuts with the compass saw in desired manner.

SUMMARY OF THE INVENTION

Accordingly, it is an object of the present invention to provide a saw table for a compass saw which avoids the disadvantages of the prior art.

More particularly, it is an object of the present invention to provide a saw table which makes possible a plurality of possibilities of cut variations in such a manner that the compass saw can be fully withdrawn from the workpiece, and at the same time does not require complicated constructions of protective devices and excessive dimensions of a saw opening in a table plate.

In keeping with these objects and with others which will become apparent hereinafter, one feature of the present invention resides, briefly state, in a saw table which has a table plate extending so that a compass saw is located under the table plate and a saw blade extends upwardly beyond the table plate, wherein protecting means is provided associated with the saw blade and arranged so that from a space above the table plate the protecting means overlap the saw blade.

When the saw table is designed in accordance with the present invention as defined hereinabove, it obtains the abovementioned objects.

In accordance with another especially advantageous feature of the present invention, the protecting means is formed as an end piece of an air guiding passage of the saw table.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing a saw table in accordance with the present invention;

FIG. 2 is a partial plan view of the saw table of FIG. 1 taken along the line A—A;

FIG. 3 is a partial view of protecting means of the inventive saw table in accordance with another embodiment of the present invention; and FIG. 4 is a perspective view of a saw table in accordance with a further embodiment of the invention.

DESCRIPTION OF PREFERRED EMBIMENTS

A saw table shown in FIGS. 1 and 2 is identified by reference numeral 1 and has a table plate 2 and legs 3. The saw table 1 serves for receiving a compass saw 4 which is formed as a hand-held power tool and located below the table blade 2.

The compass saw 4 has a plate 5 formed as a supporting plate and screwed at the lower side of the table plate 2. A saw blade 6 clamped in the compass saw 4 extends through a through-going opening 7 in the table plate into the space above the table plate 2. A holder 8 is provided at one marginal edge of the table plate 2. It has a clamping guide 9 and a clamping screw 10 which is associated with the clamping guide 9 and provided with a handle 11. The clamping guide 9 serves for receiving a tubular holder 12 so that the tubular holder 12 can be displaced in direction of its longitudinal axis parallel to the plane of the table plate and also can be fixed.

The tubular holder 12 has three receiving bores 13, 14 and 15. The receiving bores are connected with one another by a slot 16. The central bore 14 located between the lateral bores 13 and 15 extends substantially normal to the table plate 2. One of the lateral bores 13 has an axis 17 which is inclined relative to the perpendicular to the table plate 2 by an angle of −45° and directed to a pivot axis 18. The pivot axis 18 is an axis about which the compass saw 4 with the saw blade 6 pivot in known manner. The receiving bore 15 has an axis 19 which is inclined relative to the perpendicular to the table plate 2 by an angle of +45° and also directed to the pivot axis 18.

A clamping screw 20 is screwed into the tubular holder 12 between the receiving bores 13 and 14, and a clamping screw 21 is screwed into the same between the receiving bores 14 and 15. The screws 20 and 21 extend substantially normal to the slot 19. As can be seen from FIGS. 1 and 2, a tubular member 22 is inserted in the receiving bore 14 and clamped in the same with the aid of the clamping screws 20 and 21. The tubular member 22 surrounds the saw blade 6 and has an observation opening 23 for observing possible cutting regions of the saw blade. The tubular member 22 has an end which faces away from the saw blade 6 and is bent so as to form an L-shaped piece extending in a feed direction. An L-shaped dust aspirating conduit 24 is connected with the bent end of the tubular member 22.

The diameter of the tubular member 22 is so dimensioned that its inner dimension allows pivoting of the saw blade 6 between −15° and +15°. When it is necessary to produce an inclined cut with a greater inclination angle, the tubular member 22 is inserted into one of the receiving bores 13 and 15 at a proper distance relative to the upper face of the table plate 2 and is fixed in this position. In this manner, it is possible to produce inclined cuts with the saw blade 6 in the region of inclination between −45° and +45°. In order to guarantee that the tubular member 22 in all inclined positions abuts against the workpiece as tight as possible, the front end of the tubular member 22 is respectively rounded.

The tubular member 22 protects an operator, and also maintains clean the cutting region. An improved protection of the operator is guarateed when the tubular member is designed as shown in FIG. 3. The tubular member 22 is provided with an observation window 25 which is additionally secured in the vicinity of the workpiece by a bracket 26. The observation window 25 is increased in the cutting direction to a certain extent by the bracket 26. This particular construction of the end of the tubular member can be understood from the front view and plan view of FIG. 3.

A saw table shown in FIG. 4 also has the table plate 2 and the legs 3. The table plate 3 is also provided with a through-going opening 7, and the compass saw 4 with the saw blade 6 is screwed under the table plate. Instead of the holder 8, a traverse 27 is mounted at the marginal edge of the table plate 2. The traverse extends over the table plate 2 to the cutting region and is hollow.

A protective hood 28 overlaps the cutting region and has a tubular piece 29, a handle 30, a web 31 connected with the handle 30 and having sliding faces 32, and an observation opening 33. The tubular piece 29 engages into the interior of the traverse 27 and is held therein so that it cannot rotate but can displace normal to the table plate 2. The displacement is so easy that the protective hood 28 can slide out of the traverse 27 under the action of its weight until it abuts against the upper surface of the table 2 or of a workpiece.

A switch 34 is arranged in the interior of the traverse 27 and connected by conductors 35 with a dust aspirating device. Similarly to the first embodiment, the conduits of the dust aspirating device are connected with a free end 36 of the traverse 27. The switch 34 serves for switching on and switching off of the dust aspirating device, in dependence upon the relative position of the protective hood 28 with respect to the table plate 2. A movable switching member 36 of the switch 34 is directed for this purpose toward the end of the tubular piece 29.

When the protective hood 28 abuts directly against the table plate 2, the switch 34 opens and thereby the dust aspirating device is switched off. As soon as the protective hood 28 is lifted from the table plate, the switch 34 closes and switches on the dust aspirating device. The lifting of the protective hood 28 can be performed both by hand or by the handle 30 so that a workpiece slides against the sliding faces 32 and this feed movement is utilized for lifting of the protective hood.

The inner width of the protective hood 28 guarantees full movement of the saw blade 6 inside the protective hood. This protective hood 28 can be utilized for normal and inclined cuts in the entire angular region attained by the compass saw 4, without readjustment. At the same time, the protective functions and the dust aspirating functions are performed with the aid of one structural element.

It will be understood that each of the elements described above, or two or more together, may also find a useful application in other types of constructions differing from the types described above.

While the invention has been illustrated and described as embodied in a saw table for a compass saw it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A saw table for a compass saw formed particularly as a hand-held power tool, the saw table comprising a table plate having an edge and extending so that a compass saw is located under said table plate and a saw blade extends upwardly beyond said table plate at a predetermined location spaced from said edge, the saw blade being inclinable between a plurality of cutting angles and engageable between a plurality of cutting depths; means forming an air guiding passage; holding means extending from said edge of said table plate to said location and above said table plate, at a distance from the latter at said location; and protecting means for protecting the saw blade, said protecting means being held by said holding means which extends from said edge to said location above said table plate, overlapping the saw blade from a space above said table plate, being formed as an end piece of said air guiding means, and being arranged movable in direction of the saw blade, said protective means including a protective hood arranged to surround the saw blade and having an inner dimension corresponding to all cutting angles and depths of the saw blade with a sufficient play.

2. A saw table as defined in claim 1, wherein said protective hood is mounted nonrotatably and displaceable normal relative to said saw table.

3. A saw table as defined in claim 2, wherein said holding means and includes a traverse, and a hollow piece connecting said protective hood with said traverse.

4. A saw table as defined in claim 3, wherein said air guiding passage is formed as a dust aspirating means, said traverse having a first end portion connected with said hollow piece, and a second end portion connectable with said dust aspirating means.

5. A saw table as defined in claim 3, wherein said protective hood of said hollow piece is held in said traverse so easily that said protective hood is suppored on said table plate or a workpiece under the action of weight of said protective hood.

6. A saw table as defined in claim 3, wherein said protective hood of said protecting means is provided with a handle.

7. A saw table as defined in claim 6, wherein said protecting means has an inclined sliding face arranged so that when a workpiece displaces in a feed direction, it lifts by its thickness said protecting means from said table plate.

8. A saw table as defined in claim 7, and further comprising means for connecting said handle with said protective hood and including a web provided with said inclined face.

9. A saw table for a compass saw formed particularly as a hand-held power tool, the saw table comprising a table plate having an edge and extending so that a compass saw is located under said table plate and a saw blade extends upwardly beyond said table plate at a predetermined location spaced from said edge; means forming an air guiding passage; holding means extending from said edge of said table plate to said location and above said table plate, at a distance from the latter at said location; protecting means for protecting the saw blade, said protecting means being held by said holding means which extends from said edge to said location above said table plate, overlapping the saw blade from a space above said table plate, being forced as an end piece of said air guiding means, and being arranged movable in direction of the saw blade, said protecting means being liftable and lowerable in a direction substantially normal to said table plate within a predetermined movement region; and switching means associated with said protecting means and having a switch member arranged in said movement region of said protecting means.

10. A saw table as defined in claim 9, wherein said air guiding passage includes a dust aspirating conduit pivotable over 360° relative to said tubular protective element.

11. A saw table as defined in claim 9, wherein said switching means is located at least partially in said air guiding passage.

* * * * *